(12) United States Patent
Saxena et al.

(10) Patent No.: US 12,184,496 B2
(45) Date of Patent: Dec. 31, 2024

(54) SEQUENTIAL BIDIRECTIONAL MIGRATION IN AN EDGE ENVIRONMENT

(71) Applicant: International Business Machines Corporation, Armonk, NY (US)

(72) Inventors: Rajesh Kumar Saxena, Thane East (IN); Harish Bharti, Pune (IN); Sandeep Sukhija, Rajasthan (IN); Deepak Bajaj, Jaipur (IN)

(73) Assignee: International Business Machines Corporation, Armonk, NY (US)

( * ) Notice: Subject to any disclaimer, the term of this patent is extended or adjusted under 35 U.S.C. 154(b) by 15 days.

(21) Appl. No.: 17/819,015

(22) Filed: Aug. 11, 2022

(65) Prior Publication Data
US 2024/0056358 A1 Feb. 15, 2024

(51) Int. Cl.
| | |
|---|---|
| *H04L 41/0895* | (2022.01) |
| *H04L 41/5019* | (2022.01) |
| *H04W 84/04* | (2009.01) |
| *H04L 41/0894* | (2022.01) |
| *H04L 41/0897* | (2022.01) |
| *H04L 41/40* | (2022.01) |
| *H04L 41/5051* | (2022.01) |
| *H04L 41/5054* | (2022.01) |

(52) U.S. Cl.
CPC ...... *H04L 41/0895* (2022.05); *H04L 41/5019* (2013.01); *H04W 84/042* (2013.01)

(58) Field of Classification Search
CPC ............. H04L 41/0895; H04L 41/0897; H04L 41/122; H04L 41/5019; H04L 41/50; H04L 41/5041; H04W 28/084; H04W 4/50; H04W 84/042; H04W 84/045; H04W 84/18
See application file for complete search history.

(56) References Cited

U.S. PATENT DOCUMENTS

| | | | |
|---|---|---|---|
| 2020/0379805 A1 | 12/2020 | Porter et al. | |
| 2021/0021533 A1 | 1/2021 | Guim Bernat et al. | |
| 2021/0091994 A1* | 3/2021 | Meirosu | H04W 4/24 |
| 2021/0144517 A1 | 5/2021 | Guim Bernat et al. | |
| 2022/0141192 A1* | 5/2022 | Silveira | H04L 63/0823 726/15 |
| 2022/0158903 A1* | 5/2022 | D'Acunto | H04L 63/0876 |

(Continued)

FOREIGN PATENT DOCUMENTS

CN 113381889 A * 9/2021

OTHER PUBLICATIONS

Author: Nour et al. Title: "A Blockchain-Based Network Slice Broker for 5G Services" Publisher: IEEE Digital Object Identifier 10.1109/LNET.2019.2915117 (Year: 2019).*

(Continued)

*Primary Examiner* — Kamal M Hossain
(74) *Attorney, Agent, or Firm* — Yee & Associates, P.C.

(57) ABSTRACT

Runtime binary migration is provided. A slice of a 5G network is provisioned based on time period and bandwidth requirements in accordance with a service level agreement corresponding to a customer requesting performance of a business function transaction. A runtime binary for invoking the slice of the 5G network is migrated to a nodal edge server for a set of edge devices associated with the nodal edge server to perform the business function transaction using the slice of the 5G network.

19 Claims, 4 Drawing Sheets

(56) References Cited

U.S. PATENT DOCUMENTS

2022/0191303 A1    6/2022  Gupta et al.
2022/0201556 A1*   6/2022  Yang .................... H04W 48/18

OTHER PUBLICATIONS

Li et al., "Blockchain-Empowered Data-Driven Networks: A Survey and Outlook," Networking and Internet Architecture, arXiv:2101.12375, Jan. 29, 2021, 32 pages. https://arxiv.org/abs/2101.12375v1.
PCT International Search Report and Written Opinion, dated Nov. 6, 2023, regarding Application No. PCT/EP2023/071300, 11 pages.

* cited by examiner

SEQUENTIAL BIDIRECTIONAL MIGRATION IN AN EDGE ENVIRONMENT

BACKGROUND

1. Field

The disclosure relates generally to edge computing and more specifically to providing continuous sequential bidirectional migration of runtime binaries from a central host server computer to nodal edge server computers, which includes network provisioning time optimization to invoke fifth-generation (5G) narrow band-based network slices.

2. Description of the Related Art

Edge computing is a topology in a distributed computing environment where computation and data storage are bought closer to the location where they are needed. Therefore, instead of doing all computation and data storage at the cloud, the computation and data storage are done at the edge of the network. Specifically, the computation and data storage are done in devices or applications where real time data processing and storage are needed. In most cases, a consumer needs services from a service provider as per an agreed upon quality of service (e.g., a service level agreement). Applications, such as, for example, smart factory applications, smart electrical grid applications, smart farming applications, augmented reality-assisted surgery applications, and the like, are categorized as ultra-low latency applications. Ultra-low latency applications need fast processing of data and have a low tolerance for delay (i.e., network latency). For these kinds of applications and network requirements, edge computing is an ideal candidate. Communications service providers are embracing cloud and virtualization as these communications service providers deliver new 5G and edge computing services that drive growth and improve customer experiences.

SUMMARY

According to one illustrative embodiment, a computer-implemented method for runtime binary migration is provided. A computer provisions a slice of a 5G network based on time period and bandwidth requirements in accordance with a service level agreement corresponding to a customer requesting performance of a business function transaction. The computer migrates a runtime binary for invoking the slice of the 5G network to a nodal edge server for a set of edge devices associated with the nodal edge server to perform the business function transaction using the slice of the 5G network. According to other illustrative embodiments, a computer system and computer program product for runtime binary migration are provided.

DETAILED DESCRIPTION

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
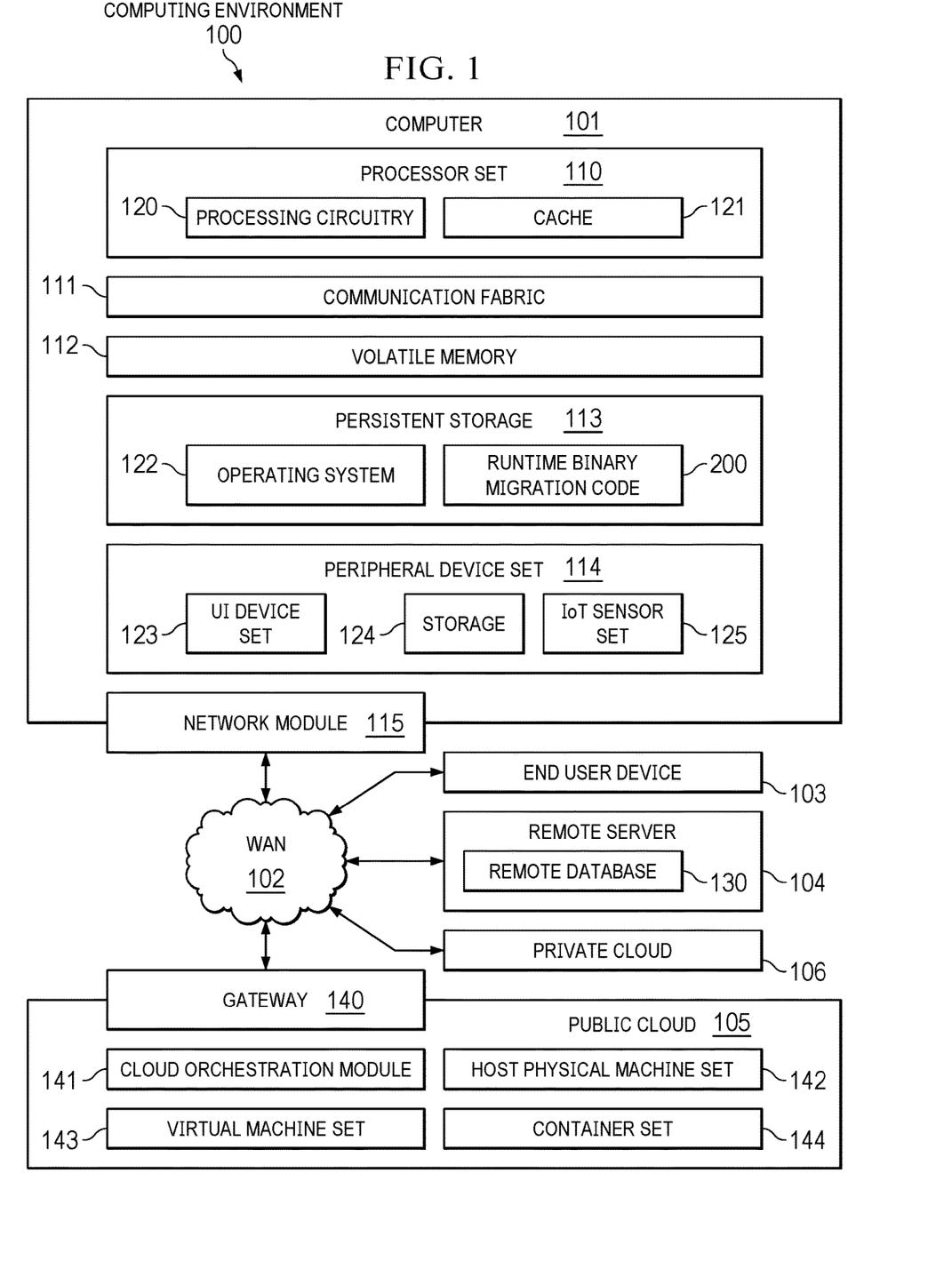
FIG. 1 is a pictorial representation of a computing environment in which illustrative embodiments may be implemented.
Figure 2:
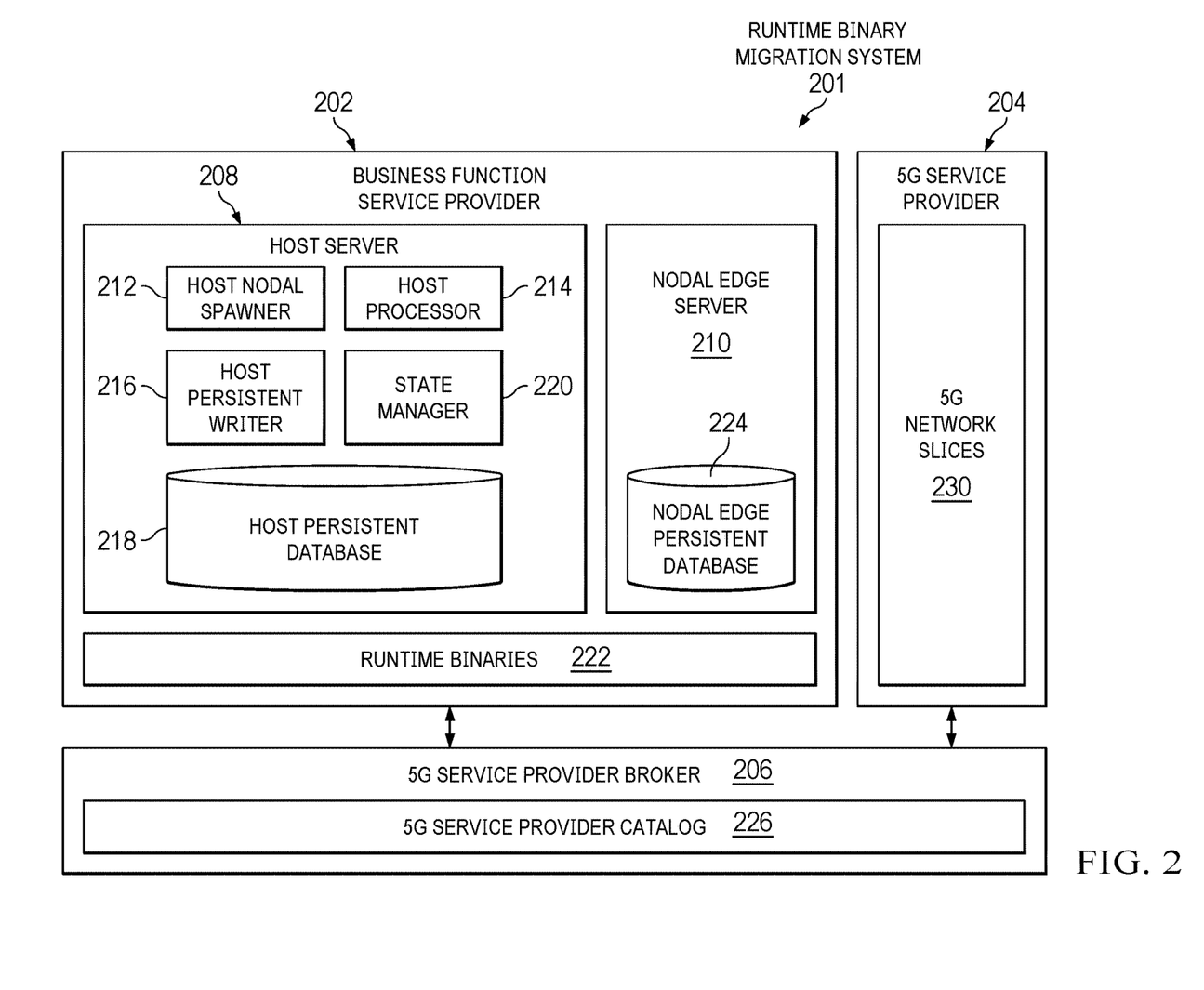
FIG. 2 is a diagram illustrating an example of a runtime binary migration system in accordance with an illustrative embodiment.

With reference now to the figures, and in particular, with reference to FIGS. 1-2, diagrams of data processing environments are provided in which illustrative embodiments may be implemented. It should be appreciated that FIGS. 1-2 are only meant as examples and are not intended to assert or imply any limitation with regard to the environments in which different embodiments may be implemented. Many modifications to the depicted environments may be made.

FIG. 1 shows a pictorial representation of a computing environment in which illustrative embodiments may be implemented. Computing environment 100 contains an example of an environment for the execution of at least some of the computer code involved in performing the inventive methods, such as runtime binary migration code 200. In addition to runtime binary migration code block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and runtime binary migration code block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in runtime binary migration code block 200 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The runtime binary migration code included in block 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As used herein, when used with reference to items, "a set of" means one or more of the items. For example, a set of clouds is one or more different types of cloud environments. Similarly, "a number of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Illustrative embodiments enable a novel edge provisioning process to provide a novel solution to existing technical deficiencies of current solutions not optimally utilizing the power of edge computing. Utilizing the power of narrow band-based network slices of a 5G network corresponding to a 5G service provider, illustrative embodiments build a virtualized network function, which corresponds to a defined business function, from an existing clone with specifications that adjust resources (e.g., scale up or scale down resources) to match the bandwidth illustrative embodiments provision in the narrow band-based network slices of the 5G network to perform the defined business function. A set of edge devices needs from the 5G network a narrow band-based network slice of the 5G network in terms of, for example, start time, end time, bandwidth, and the like to perform the defined business function. The virtualized network function provisions the narrow band-based network slice of the 5G network for the defined business function. The existing clone is a copy of a runtime binary which indicates resources needed by the set of edge devices to perform the defined business function. Illustrative embodiments migrate and upload the existing clone of the runtime binary to the set of edge devices. It should be noted that the set of edge devices are the only devices that are able to access the narrow band-based network slice of the 5G network provisioned for that particular business function. Also, it should be noted that illustrative embodiments can adjust an available amount of time of a slice and/or scale an amount of bandwidth of a slice for different edge devices using runtime binary partitions.

Illustrative embodiments provision and execute the virtualized network function on the edge by providing lightweight runtime binaries. A runtime binary is a runtime configuration (e.g., to obtain any resources that the set of edge devices needs) to invoke the narrow band-based network slice of the 5G network and perform that particular business function. Illustrative embodiments utilize a central host server to scale up needed runtime binaries on nodal edge servers on the fly in real time and scale down the runtime binaries on the nodal edge servers when edge devices finish or complete execution of corresponding business functions. Illustrative embodiments provide continuous bidirectional migration of runtime binaries from the central host server to nodal edge servers and vice-versa, which also includes network provisioning time optimization to invoke 5G narrow band-based network slices (e.g., decrease time to provision the 5G narrow band-based network slices) increasing performance.

The nodal edge server sends a request for a narrow band-based network slice of the 5G network comprising a specified bandwidth over a specified time period. In response to receiving the request from the nodal edge server, the central host server performs a runtime binary identification process to determine which runtime binary is needed by a set of edge devices corresponding to the nodal edge server. In response to determining the appropriate runtime binary, the central host server clones the runtime binary that is geographically closest to the nodal edge server and migrates the cloned runtime binary to that nodal edge server. Then, the nodal edge server sends the cloned runtime binary to the set of edge devices to invoke the narrow band-based network slice of the 5G network to perform the defined business function (e.g., automatically operate a set of water sprinkler systems on a set of farms at a specified time period and at a specified bandwidth). Of course, the defined business function may be any type of function associated with an ultra-low latency application that automatically performs a set of tasks or actions requested by a customer from a service provider of that function via a 5G network.

The nodal edge server triggers the request for a narrow band-based network slice of the 5G network. A 5G service provider broker or marketplace identifies an appropriate 5G service provider to provide the requested narrow band-based network slice of the 5G network. The central host server performs a provisioning process to obtain the narrow band-based network slice of the 5G network (i.e., the exact amount of time and bandwidth from the selected 5G service provider) for the set of edge devices to perform the defined business function. The selected 5G service provider ensures synchronous state of the set of edge devices is available at the edge of the 5G network. Depending on resource requirements, the central host server determines runtime binary provisioning. Based on the permissible network latency defined by, for example, service level agreement, contract, or the like, the central host server configures the services at the nodal edge server.

The central host server migrates runtime binaries from a nodal edge server only if no geographically close edge server in the same zone has needed runtime binaries that can be cloned. After identifying the 5G service provider during the provisioning process, a state manager of the central host server determines whether a new runtime binary is needed or not. The central host server utilizes the state manager to store state details of all runtime binaries stored on all nodal edge servers. In other words, the state manger identifies which runtime binary is appropriate for a particular nodal edge server and which runtime binary needs to be cloned or migrated. Based on initial and final configuration states on a particular nodal edge server, the central host server either performs migration or deletion of runtime binaries.

Illustrative embodiments ensure a parallel run between source host server and nodal edge servers by continuous sequential migration of runtime binaries or runtime binary partitions supported by a distributed ledger-based 5G service provider broker, which is connected to a plurality of 5G service providers. A runtime binary partition is only a portion or segment of a runtime binary that is needed by a given edge device or set of edge devices to perform a particular business function. Illustrative embodiments optimize the total time taken for all runtime binary migrations in progress and stop a service request validation process until acknowledgement is received from the nodal edge server. In addition, at the end of business function transactions, illustrative embodiments scale down all corresponding runtime binaries from nodal edge servers so that the runtime binaries are migrated back to the central host server. Illustrative embodiments serialize and marshal all business function transactions on a distributor ledger, which confirms idempotency or nullity of each respective business function transaction using crypt objects.

Thus, illustrative embodiments provide a framework for edge provisioning by ensuring that all current runtime binaries are available as per received service requests from customers. Based on the geographic location of the service request and state of a runtime binary at a nodal edge server, illustrative embodiments determine whether to start migration of a runtime binary to the nodal edge server as the state of the runtime binary on the nodal edger server may not be synchronized with an updated runtime binary on the central host server. In other words, the runtime binary on the nodal edge server may be outdated and not what the nodal edge server needs to invoke the correct narrow band-based network slice of the 5G network for the set of edge devices to perform the defined business function.

The continuous sequential migration of runtime binaries ensures that illustrative embodiments migrate runtime binaries from same source host server to same destination nodal edge servers and that states of runtime binaries on source and destination are synchronized. The continuous bidirectional migration of runtime binaries ensures that in response to a post shift in business function transaction density, illustrative embodiments remove runtime binaries on the nodal edge server and migrate all runtime binaries back to the central host server, which ensures consistency of runtime binary states as illustrative embodiments may need to spin-up new runtime binaries at new nodal edge servers. Post shift in business function transaction density means that the business function has been moved to a different geographic location and, therefore, illustrative embodiments need to migrate the corresponding runtime binary to the closest nodal edge server associated with the set of edge devices that will perform that particular business function. The 5G service provider broker supports all business function transactions and ensures that security constraints are not violated throughout migration of runtime binaries across the 5G network from the central host server to nodal edge servers.

Illustrative embodiments write each respective business function transaction as a data block to a persistent database of the central host server after serialization of a crypt object persisting 5G slice requirements corresponding to the business function transaction. Illustrative embodiments utilize the data block model because of the time-series unstructured schema-definition for persistence, which allows selected data block replication instead of file driven replication. Illustrative embodiments copy the data block corresponding to each respective business function to a persistent database of the nodal edge server. For example, a host persistent writer of the central host server copies the persisted request for the 5G slice requirements corresponding to the business function transaction as crypt object and sends the crypt object to the appropriate nodal edge server associated with the set of edge devices that will perform the business function. The nodal edge server writes this crypt object containing the 5G slice requirements corresponding to the business function to a persistent database of the nodal edge server. Afterward, the nodal edge server acknowledges receipt of the crypt object to the host persistent writer. In response to receiving the acknowledgement from the nodal edge server, the host persistent writer calculates the 5G network slice requirements of, for example, start time, end time, bandwidth, and the like, for performance of the business function by the set of edge devices associated with the nodal edge server. Illustrative embodiments provision the 5G network in accordance with the calculated 5G network slice requirements.

For identification of the 5G slice requirements (i.e., time and bandwidth), which will be required for performance of the business function by the set of edge devices, the nodal edge server initially sends a business function transaction acknowledgement to the central host server. In response to receiving the business function transaction acknowledgement, the host persistent writer calculates the 5G slice requirement details and shares the 5G slice requirement details with a host processor of the central host server. The host processor provisions the 5G network based on the 5G slice requirement details input from the host persistent writer. Every time the nodal edge server executes the business function transaction on the set of edge devices, the nodal edge server sends a crypt object with details of the business function transaction to the central host server for storage on the host persistent database.

Thus, illustrative embodiments provide one or more technical solutions that overcome a technical problem with providing migration of runtime binaries from a central host server computer to nodal edge server computers using narrow band-based network slices of a 5G network for edge devices to perform defined business functions. As a result, these one or more technical solutions provide a technical effect and practical application in the field of edge computing.

With reference now to FIG. 2, a diagram illustrating an example of a runtime binary migration system is depicted in accordance with an illustrative embodiment. Runtime binary migration system 201 may be implemented in a computing environment, such as computing environment 100 in FIG. 1. Runtime binary migration system 201 is a system of hardware and software components for continuous sequential bidirectional migration of runtime binaries from a central host server computer to nodal edge server computers, which includes network provisioning time optimization to invoke 5G narrow band-based network slices.

In this example, runtime binary migration system 201 includes business function service provider 202, 5G service provider 204, and 5G service provider broker 206. However, it should be noted that runtime binary migration system 201 is intended as an example only and not as a limitation on illustrative embodiments. In other words, runtime binary migration system 201 may include any number of business function service providers, 5G service providers, 5G service provider brokers, and other providers and components not shown.

Business function service provider 202 provides services corresponding to business functions of ultra-low latency applications requested by customers via client devices, such as, for example, end user device 103 in FIG. 1. 5G service provider 204 provides the 5G network for performing the requested business functions of the ultra-low latency applications. 5G service provider broker 206 selects an appropriate 5G service provider (e.g., 5G service provider 204) to provide the 5G network for performing the requested business functions. In other words, 5G service provider broker 206 is an interface between business function service provider 202 and 5G service provider 204.

Business function service provider 202 includes host server 208 and nodal edge server 210. Host server 208 is a central computer that controls and coordinates operations in a plurality of nodal edge servers, such as nodal edge server 210, of the hybrid edge environment. In this example, host server 208 includes host nodal spawner 212, host processor 214, host persistent writer 216, host persistent database 218, and state manager 220. However, it should be noted that host server 208 can include more components than shown, such as, for example, a nodal edge orchestrator and the like.

Host server 208 utilizes host nodal spawner 212 to receive crypt objects containing details of business function transactions requested by customers to be performed. In addition, host server 208 utilizes host nodal spawner 212 to add new virtual nodal edge servers as needed to perform business function transactions. Host server 208 utilizes host processor 214 to provision narrow band-based network slices of a 5G network, such as 5G network slices 228 corresponding to 5G service provider 204, for edge devices to perform the business function transactions based on slice requirements calculated by host persistent writer 216. Host persistent writer 216 calculates the slice requirements based on the details of business function transactions received by host nodal spawner 212.

Further, host processor 214 migrates runtime binaries 222 to the plurality of nodal edge servers. The nodal edge servers send runtime binaries 222 to associated edge devices to invoke the narrow band-based network slices of the 5G network for the edge devices to perform their corresponding business function transactions. Runtime binaries 222 are runtime configurations that obtain the resources needed by the edge devices to invoke the narrow band-based network slices of the 5G network and perform their corresponding business function transactions. Furthermore, host persistent writer 216 writes the slice requirements, the details of the business function transactions, and the runtime binaries corresponding to each particular nodal edge server to host persistent database 218. Thus, host server 208 knows which particular nodal edge server has which particular runtime binary. Moreover, host server 208 utilizes state manager 220 to store state details of all runtime binaries stored on all nodal edge servers in the hybrid edge environment.

Nodal edge server 210 is an edge computer of the hybrid edge environment. Nodal edge server 210 manages the operation of a set of edge devices to automatically perform a set of business function transactions. The set of edge devices automatically perform their corresponding set of business function transactions in accordance with their associated narrow band-based network slices of the 5G network. The set of edge devices invoke the narrow band-based network slices of the 5G network using a particular runtime binary provided by nodal edge server 210. Nodal edge server 210 stores the runtime binary, which was migrated to nodal edge server 210 by host processor 214, in nodal edge persistent database 224.

5G service provider broker 206 includes 5G service provider catalog 226. 5G service provider broker 206 utilizes 5G service provider catalog 226 to select the appropriate 5G service provider based on, for example, customer price, customer service level agreement, geographic location of service requests, geographic location of edge devices to perform business function transactions, and the like.

5G service provider 204 provides 5G network slices 228 of the 5G network corresponding to 5G service provider 204. 5G network slices 228 represent a plurality of narrow band-based network slices of the 5G network for edge devices to perform their corresponding business function transactions. A narrow band-based network slice has a specified start time, end time, and bandwidth of the 5G network. Each set of edge devices has its own narrow band-based network slice to perform its corresponding business function transaction and only that set of edge devices is able to access that particular narrow band-based network slice.

Figure 3:
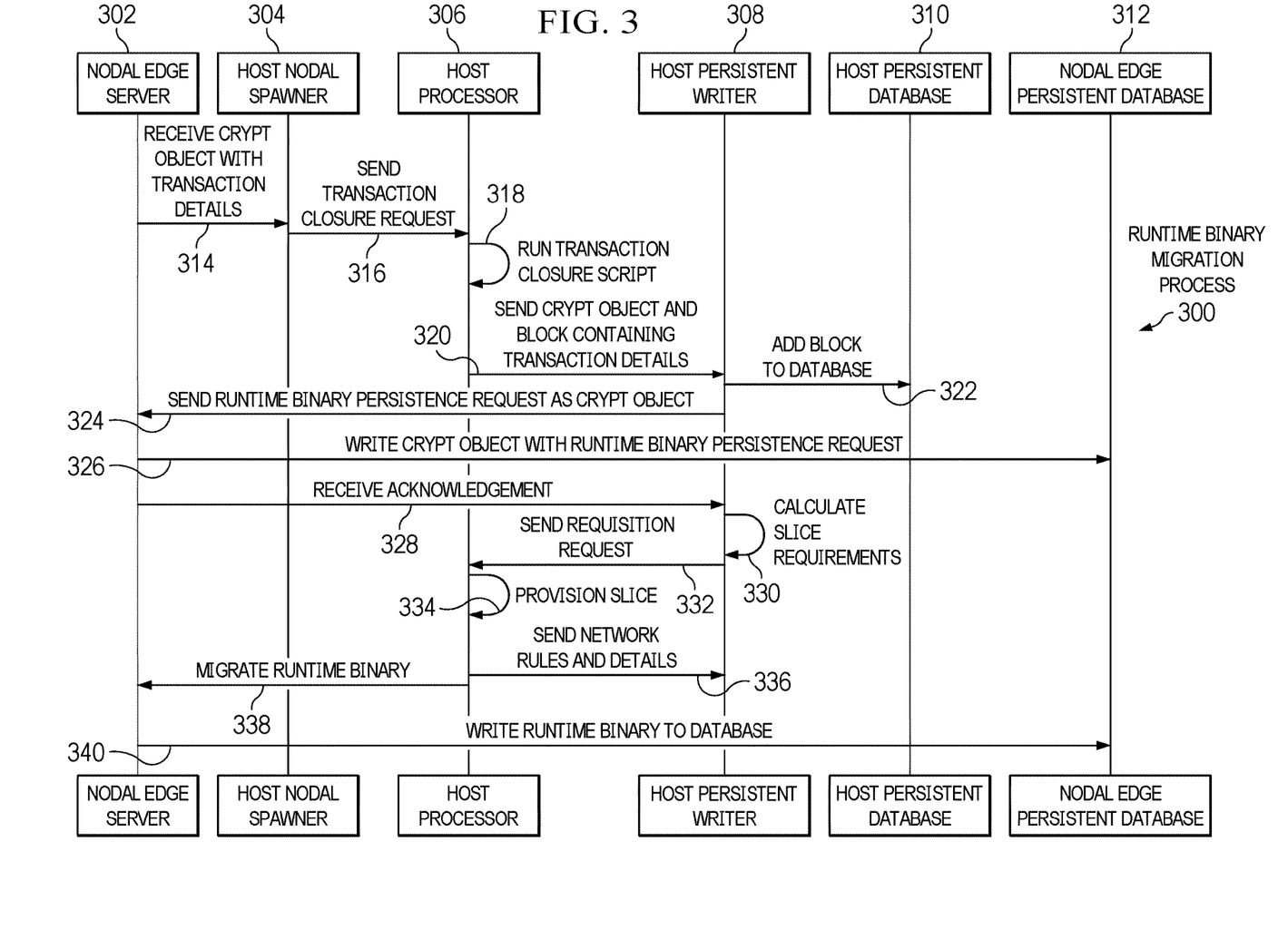
FIG. 3 is a diagram illustrating an example of a runtime binary migration process in accordance with an illustrative embodiment.

With reference now to FIG. 3, a diagram illustrating an example of a runtime binary migration process is depicted in accordance with an illustrative embodiment. Runtime binary migration process 300 may be implemented in a runtime binary migration system, such as, for example, runtime binary migration system 201 in FIG. 2. For example, runtime binary migration process 300 illustrates the migration of runtime binaries from a central host server to a given nodal edge server.

In this example, runtime binary migration process 300 includes nodal edge server 302, host nodal spawner 304, host processor 306, host persistent writer 308, host persistent database 310, and nodal edge persistent database 312. Nodal edge server 302, host nodal spawner 304, host processor 306, host persistent writer 308, host persistent database 310, and nodal edge persistent database 312 may be, for example, nodal edge server 210, host nodal spawner 212, host processor 214, host persistent writer 216, host persistent database 218, and nodal edge persistent database 224 in FIG. 2. Also, it should be noted that host processor 306, host persistent writer 308, and host persistent database 310 are included in a host server, such as, for example, host server 208 in FIG. 2.

At 314, host nodal spawner 304 receives from nodal edge server 302 a crypt object that contains details of a business function transaction requested by a customer to be performed. Host nodal spawner 304 decrypts the crypt object to ensure legitimacy of the business function transaction. At 316, in response to receiving the crypt object with the details of the business function transaction request, host nodal spawner 304 sends a closure request for the business function transaction to host processor 306. At 318, in response to receiving the business function transaction closer request from host nodal spawner 304, host processor 306 runs a business function transaction closure script that serializes a data block containing the details of the business function transaction retrieved from the crypt object.

At 320, host processor 306 sends the crypt object and the data block containing the details of the business function transaction to host persistent writer 308. At 322, host persistent writer 308 adds the data block containing the details of the business function transaction as a new entry in host persistent database 310. In addition, at 324, host persistent writer 308 sends a persistence request corresponding to a runtime binary as a crypt object to nodal edge server 302. At 326, nodal edge server 302 writes the crypt object containing the persistence request corresponding to the runtime binary to nodal edge persistent database 312 of nodal edge server 302. Further, at 328, host persistent writer 308 receives an acknowledgement indicating that nodal edge server 302 is ready to receive the runtime binary to invoke a slice of a 5G network for a set of edge devices to perform the business function transaction.

At 330, in response to receiving the acknowledgement from nodal edge server 302, host persistent writer 308 calculates time period and bandwidth requirements for the slice of the 5G network in order for the set of edge devices to perform the business function transaction. Host persistent writer 308 utilizes the details of the business function transaction stored in host persistent database 310 to calculate the time period and bandwidth requirements for the slice of the 5G network. At 332, host persistent writer 308 sends a requisition request to host processor 306 to obtain the calculated time period and bandwidth requirements for the slice of the 5G network.

At 334, in response to receiving the requisition request, host processor 306, in accordance with a service level agreement corresponding to a service request by the customer requesting performance of the business function transaction, provisions the slice of the 5G network based on the calculated time period and bandwidth requirements. It should be noted that 334 is a validation step. In other words, host processor 306 validates the service request of the customer using the service level agreement (e.g., allowed network latency and the like). At 336, host processor 306 sends network rules and details corresponding to the provisioning of the slice of the 5G network, along with the runtime binary to invoke the slice of the 5G network for the set of edge devices to perform the business function transaction, to host persistent writer 308 to write the network rules and details, along with the runtime binary, in host persistent database 310. Furthermore, at 338, host processor 306 migrates the runtime binary for invoking the slice of the 5G network to nodal edge server 302. Then, nodal edge server 302 sends the runtime binary to the set of edge devices associated with nodal edge server 302 to perform the business function transaction using the slice of the 5G network, which is time sensitized. In addition, at 340, nodal edge server 302 writes the runtime binary to nodal edge persistent database 312.

To ensure migration of the runtime binary of partition $p_j$, from the source host server $s_i$ to destination nodal edge server $s_k$ for next time instance t+1, host persistent writer 308 sets an indicator of migration to in progress and sets variable $x_{i,j,k,t+1}$, to 1, until host processor 306 migrates the entire runtime binary. For example, host processor 306 for the runtime binary migration can utilize the following definitions and equations:

$S$ Set of servers across all data centers, (1)

where $S = \{s_1, s_2, \ldots, s_i, \ldots, s_k, \ldots, s_{|S|}\}$ $\beta$ Scalar–latency constant (2)

$P$ Set of runtime binary partitions, (3)

where $P = p_1, p_2, \ldots, p_j, \ldots, p_{|P|}$ $R |S| \times |P| \times |S| \times T$ matrix, (4)

where, $r_{i,j,k,t}$ represents the bandwidth allocated for migrating runtime binary of $p_j$ from $s_i$ $T$ Worst–case migration time (5)

$X |S| \times |P| \times |S| \times T$ matrix representing migration sequence (6)

where, $$x_{i,j,k,t} = \begin{cases} 1 & s_i \text{ is migrating runtime binary of } p_j \text{ to } s_k \text{ at time } 't' \\ 0, & \text{otherwise} \end{cases}$$

$Z |S| \times |P| \times T$ matrix representing runtime binary placement, (7)

where, $z_{i,j,t} = \begin{cases} 1 & s_i \text{ has runtime binary of } p_j \text{ at time } t \\ 0, & \text{otherwise} \end{cases}$ $W$ A vector of size $T$, (8)

where, $w_t = \begin{cases} 1 & \text{if migration is in progress at time } 't' \\ 0, & \text{otherwise} \end{cases}$ $$\left\{ \sum_{k=1}^{|S|} x_{i,j,k,t} \leq z_{i,j,t} \right\}_{\forall 1 \leq i, \leq |S|, 1 \leq j \leq |P|, 1 \leq t \leq T}$$ (9)

$$\left\{ \beta \cdot x_{i,j,k,t+1} \geq |p_j| - \sum_{t'=1}^{t} r_{I,j,k,t'} \right\}_{\forall 1 \leq I,k, i \neq k \leq |S|, 1 \leq j \leq |P|, 1 \leq t \leq T-1}$$ (10)

$$\left\{ x_{i,j,k,t+1} \leq |p_j| - \sum_{t'=1}^{t} r_{I,j,k,t'} \right\}_{\forall 1 \leq I,k, i \neq k \leq |S|, 1 \leq j \leq |P|, 1 \leq t \leq T-1}$$ (11)

However, it should be noted that the definitions and equations above are meant as examples only and not as limitations on illustrative embodiments. Further, host processor 306 can extend the total migration time to include all runtime binary migrations in progress and then stop the runtime binary migration process utilizing the following exemplary equations:

$$\{w_t \geq x_{i,j,k,t}\}_{\forall 1 \leq I,k, i \neq k \leq |S|, 1 \leq j \leq |P|, 1 \leq t \leq T}$$ (12)

$$\{w_t \geq w_{t+1}\}_{\forall 1 \leq t \leq T+1}.$$ (13)

Figure 4:
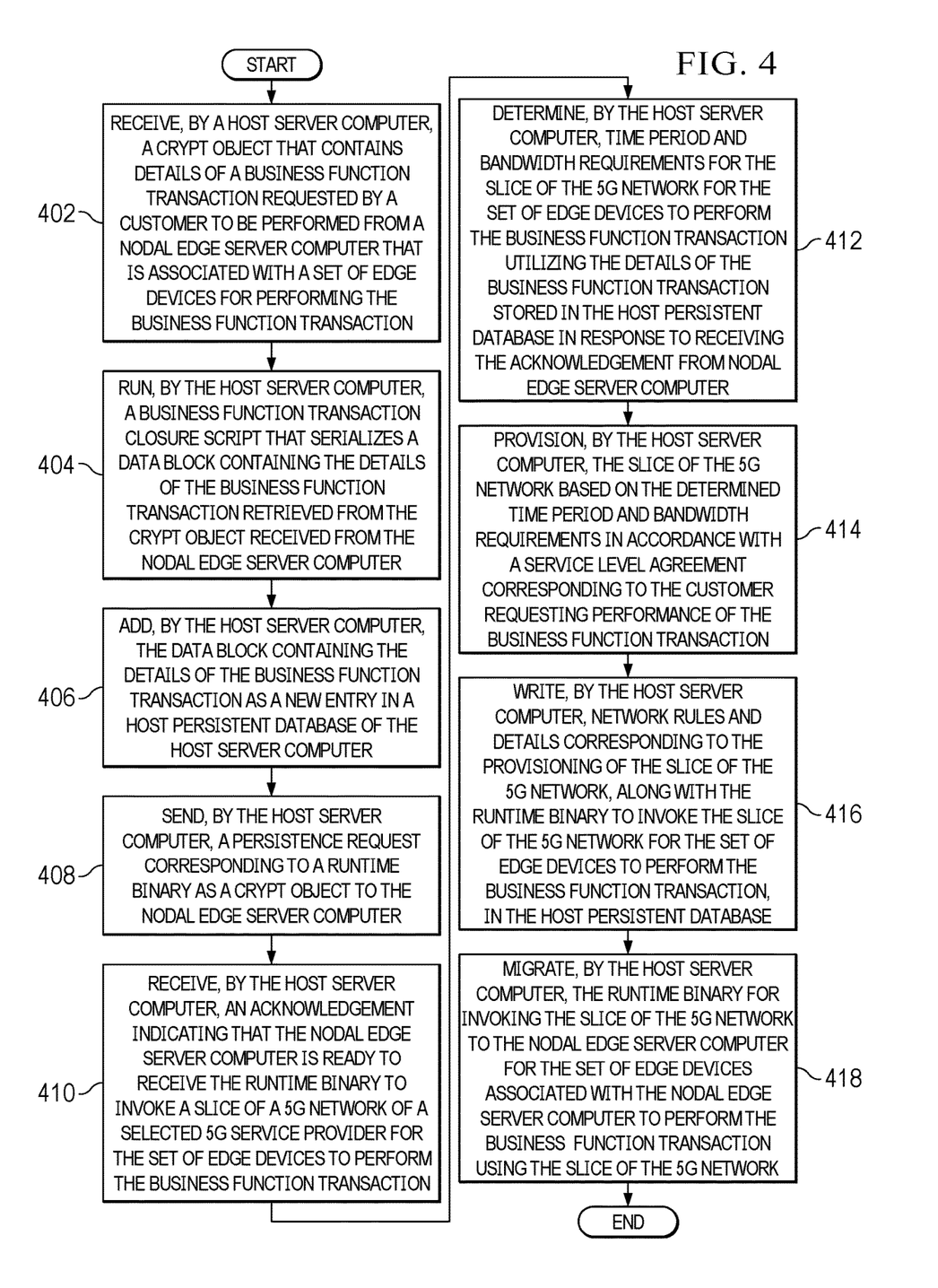
FIG. 4 is a flowchart illustrating a process for runtime binary migration in accordance with an illustrative embodiment.

With reference now to FIG. 4, a flowchart illustrating a process for runtime binary migration is shown in accordance with an illustrative embodiment. The process shown in FIG. 4 may be implemented in a host server computer, such as, for example, computer 101 in FIG. 1 or host server 208 in FIG. 2. For example, the process shown in FIG. 4 may be implemented in runtime binary migration code 200 in FIG. 1.

The process begins when the host server computer receives a crypt object that contains details of a business function transaction requested by a customer to be performed from a nodal edge server computer that is associated with a set of edge devices for performing the business function transaction (step 402). The host server computer runs a business function transaction closure script that serializes a data block containing the details of the business function transaction retrieved from the crypt object received from the nodal edge server computer (step 404). The host server computer adds the data block containing the details of the business function transaction as a new entry in a host persistent database of the host server computer (step 406).

In addition, the host server computer sends a persistence request corresponding to a runtime binary as a crypt object to the nodal edge server computer (step 408). Subsequently, the host server computer receives an acknowledgement indicating that the nodal edge server computer is ready to receive the runtime binary to invoke a slice of a 5G network of a selected 5G service provider for the set of edge devices to perform the business function transaction (step 410). The host server computer determines time period and bandwidth requirements for the slice of the 5G network for the set of edge devices to perform the business function transaction utilizing the details of the business function transaction stored in the host persistent database in response to receiving the acknowledgement from nodal edge server computer (step 412).

Then, the host server computer provisions the slice of the 5G network based on the determined time period and bandwidth requirements in accordance with a service level agreement corresponding to the customer requesting performance of the business function transaction (step 414). Further, the host server computer writes network rules and details corresponding to the provisioning of the slice of the 5G network, along with the runtime binary to invoke the slice of the 5G network for the set of edge devices to perform the business function transaction, in the host persistent database (step 416). Furthermore, the host server computer migrates the runtime binary for invoking the slice of the 5G network to the nodal edge server computer for the set of edge devices associated with the nodal edge server computer to perform the business function transaction using the slice of the 5G network (step 418). Thereafter, the process terminates.

Thus, illustrative embodiments of the present invention provide a computer-implemented method, computer system, and computer program product for providing continuous sequential bidirectional migration of runtime binaries from a central host server computer to nodal edge server computers, which includes network provisioning time optimization to invoke 5G narrow band-based network slices. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for runtime binary migration, the computer-implemented method comprising:

provisioning, by a computer, a slice of a fifth-generation (5G) network based on time period and bandwidth requirements in accordance with a service level agreement corresponding to a customer requesting performance of a business function transaction, wherein a 5G service provider broker selects a 5G service provider from a plurality of 5G service providers to provide the slice of the 5G network;

migrating, by the computer, a runtime binary for invoking the slice of the 5G network from a central host server to a nodal edge server based on geographical location of the nodal edge server for a set of edge devices associated with the nodal edge server to perform the business function transaction using the slice of the 5G network, wherein the migration is bidirectional so that the runtime binary is migrated back to the central host server at end of the business function transaction, and wherein the migration is performed in a sequential manner to ensure the state of the runtime binary on the central host server and the state of the runtime binary on the nodal edge server are synchronized; and adding, by the computer, a data block containing the details of the business function transaction in a persistent database of the computer.

2. The computer-implemented method of claim 1, wherein the slice of the 5G network is a narrow band-based network slice that is comprised of a specified start time, end time, and bandwidth, wherein the set of edge devices are a plurality of edge devices associated with the nodal edge server to perform the business function transaction using the slice of the 5G network, and wherein the nodal edge server comprises a persistent database.

3. The computer-implemented method of claim 2, wherein the runtime binary is a runtime configuration that obtains resources needed by the set of edge devices to invoke the narrow band-based network slice of the 5G network and perform the business function transaction.

4. The computer-implemented method of claim 1 further comprising:

determining, by the computer, the time period and bandwidth requirements for the slice of the 5G network for the set of edge devices to perform the business function transaction utilizing details of the business function transaction stored in a persistent database of the computer in response to receiving an acknowledgement from the nodal edge server indicating that the nodal edge server is ready to receive the runtime binary.

5. The computer-implemented method of claim 4 further comprising:

receiving, by the computer, a crypt object that contains the details of the business function transaction requested by the customer to be performed from the nodal edge server that is associated with the set of edge devices for performing the business function transaction; and running, by the computer, a business function transaction closure script that serializes a data block containing the details of the business function transaction retrieved from the crypt object received from the nodal edge server.

6. The computer-implemented method of claim 4 further comprising:

sending, by the computer, a persistence request corresponding to the runtime binary as a crypt object to the nodal edge server; and receiving, by the computer, the acknowledgement indicating that the nodal edge server is ready to receive the runtime binary to invoke the slice of the 5G network for the set of edge devices to perform the business function transaction.

7. The computer-implemented method of claim 1 further comprising:

writing, by the computer, network rules and details corresponding to the provisioning of the slice of the 5G network, along with the runtime binary to invoke the slice of the 5G network for the set of edge devices to perform the business function transaction, in the persistent database of the computer.

8. The computer-implemented method of claim 2, wherein the business function transaction is associated with an ultra-low latency application, and further comprising:

using the runtime binary to invoke the slice of the 5G network migrated to the nodal edge server by sending, by the nodal edge server, the runtime binary to the plurality of edge devices associated with the nodal edge server to perform the business function transaction using the slice of the 5G network.

9. The computer-implemented method of claim 1, wherein the 5G service provider broker supports the business function transaction and ensures that security constraints are not violated throughout migration of the runtime binary across the 5G network from the computer to the nodal edge server.

10. A computer system for runtime binary migration, the computer system comprising:

a communication fabric;

a storage device connected to the communication fabric, wherein the storage device stores program instructions; and a processor connected to the communication fabric, wherein the processor executes the program instructions to:

provision a slice of a fifth-generation (5G) network based on time period and bandwidth requirements in accordance with a service level agreement corresponding to a customer requesting performance of a business function transaction, wherein a 5G service provider broker selects a 5G service provider from a plurality of 5G service providers to provide the slice of the 5G network;

migrate a runtime binary for invoking the slice of the 5G network from a central host server to a nodal edge server based on geographical location of the nodal edge server for a set of edge devices associated with the nodal edge server to perform the business function transaction using the slice of the 5G network, wherein the migration is bidirectional so that the runtime binary is migrated back to the central host server at end of the business function transaction, and wherein the migration is performed in a sequential manner to ensure the state of the runtime binary on the central host server and the state of the runtime binary on the nodal edge server are synchronized; and add, by the computer, a data block containing the details of the business function transaction in a persistent database of the computer system.

11. The computer system of claim 10, wherein the slice of the 5G network is a narrow band-based network slice that is comprised of a specified start time, end time, and bandwidth, wherein the set of edge devices are a plurality of edge devices associated with the nodal edge server to perform the business function transaction using the slice of the 5G network, and wherein the nodal edge server comprises a persistent database.

12. The computer system of claim 11, wherein the runtime binary is a runtime configuration that obtains resources needed by the set of edge devices to invoke the narrow band-based network slice of the 5G network and perform the business function transaction.

13. A computer program product for runtime binary migration, the computer program product comprising a computer-readable storage medium having program instructions embodied therewith, the program instructions executable by a computer to cause the computer to perform a method of:

provisioning, by the computer, a slice of a fifth-generation (5G) network based on time period and bandwidth requirements in accordance with a service level agreement corresponding to a customer requesting performance of a business function transaction, wherein a 5G service provider broker selects a 5G service provider from a plurality of 5G service providers to provide the slice of the 5G network;

migrating, by the computer, a runtime binary for invoking the slice of the 5G network from a central host server to a nodal edge server based on geographical location of the nodal edge server for a set of edge devices associated with the nodal edge server to perform the business function transaction using the slice of the 5G network, wherein the migration is bidirectional so that the runtime binary is migrated back to the central host server at end of the business function transaction, and wherein the migration is performed in a sequential manner to ensure the state of the runtime binary on the central host server and the state of the runtime binary on the nodal edge server are synchronized; and adding, by the computer, a data block containing the details of the business function transaction in a persistent database of the computer.

14. The computer program product of claim 13, wherein the slice of the 5G network is a narrow band-based network slice that is comprised of a specified start time, end time, and bandwidth, wherein the set of edge devices are a plurality of edge devices associated with the nodal edge server to perform the business function transaction using the slice of the 5G network, and wherein the nodal edge server comprises a persistent database.

15. The computer program product of claim 14, wherein the runtime binary is a runtime configuration that obtains resources needed by the set of edge devices to invoke the narrow band-based network slice of the 5G network and perform the business function transaction.

16. The computer program product of claim 13 further comprising:

determining, by the computer, the time period and bandwidth requirements for the slice of the 5G network for the set of edge devices to perform the business function transaction utilizing details of the business function transaction stored in a persistent database of the computer in response to receiving an acknowledgement from the nodal edge server indicating that the nodal edge server is ready to receive the runtime binary.

17. The computer program product of claim 16 further comprising:

receiving, by the computer, a crypt object that contains the details of the business function transaction requested by the customer to be performed from the nodal edge server that is associated with the set of edge devices for performing the business function transaction; and running, by the computer, a business function transaction closure script that serializes a data block containing the details of the business function transaction retrieved from the crypt object received from the nodal edge server.

18. The computer program product of claim 16 further comprising:

sending, by the computer, a persistence request corresponding to the runtime binary as a crypt object to the nodal edge server; and receiving, by the computer, the acknowledgement indicating that the nodal edge server is ready to receive the runtime binary to invoke the slice of the 5G network for the set of edge devices to perform the business function transaction.

19. The computer program product of claim 13 further comprising:

writing, by the computer, network rules and details corresponding to the provisioning of the slice of the 5G network, along with the runtime binary to invoke the slice of the 5G network for the set of edge devices to perform the business function transaction, in the persistent database of the computer.

* * * * *